(12) United States Patent
Riedinger et al.

(10) Patent No.: US 11,385,073 B2
(45) Date of Patent: Jul. 12, 2022

(54) METHOD AND SYSTEM FOR AIRCRAFT NAVIGATION

(71) Applicant: THALES, Courbevoie (FR)

(72) Inventors: Marc Riedinger, Toulouse (FR);
Jean-Pierre Arethens, Valence (FR);
Philippe Chaix, Toulouse (FR)

(73) Assignee: THALES, Courbevoie (FR)

( * ) Notice: Subject to any disclaimer, the term of this patent is extended or adjusted under 35 U.S.C. 154(b) by 385 days.

(21) Appl. No.: 16/675,726

(22) Filed: Nov. 6, 2019

(65) Prior Publication Data

US 2020/0149922 A1  May 14, 2020

(30) Foreign Application Priority Data

Nov. 13, 2018 (FR) ...................................... 18 71548

(51) Int. Cl.
 *G01C 21/20* (2006.01)
 *G01S 1/26* (2006.01)
 (Continued)

(52) U.S. Cl.
 CPC ............ *G01C 23/00* (2013.01); *G01C 21/005* (2013.01); *G01C 21/20* (2013.01); *G01S 1/026* (2013.01); *G01S 2201/06* (2019.08)

(58) Field of Classification Search
 CPC . G01S 1/02; G01S 1/024; G01S 1/028; G01S 5/14; H04W 64/00; G01C 21/00; G01C 21/20; G01C 23/00
 (Continued)

(56) References Cited

U.S. PATENT DOCUMENTS

| 3,936,828 A | | 2/1976 | Muesse et al. | |
|---|---|---|---|---|
| 6,112,141 A | * | 8/2000 | Briffe | G01C 23/00 345/1.3 |

(Continued)

FOREIGN PATENT DOCUMENTS

| CA | 2712047 A1 | * | 7/2009 | ............ B66F 17/003 |
|---|---|---|---|---|
| WO | WO-03018397 A1 | * | 3/2003 | ............ B63C 9/0005 |
| WO | WO-03018398 A1 | * | 3/2003 | ............ B63C 9/0005 |

OTHER PUBLICATIONS

Eric Foxlin et al., "Constellation A Wide-Range Wireless Motion-Tracking System for Augmented Reality and Virtual Set Applications" SIGGRAPH '98: Proc, of the 25th annual conf. on Computer graphics & interactive technique (Year: 1998).*

(Continued)

*Primary Examiner* — Cuong H Nguyen
(74) *Attorney, Agent, or Firm* — ArentFox Schiff LLP

(57) ABSTRACT

The invention relates to a method and a system for aircraft navigation along a predetermined airway, including an on-board navigation system supplying a positioning integrity of the aircraft during flight relative to said airway respecting an expected position precision performance level, and at least one on-board radio receiver on the aircraft suitable for communicating with at least one land-based radio beacon suitable for supplying a distance of the aircraft relative to said radio beacon. The system includes a module configured to obtain, from a current position of the aircraft and stored data, a tuple of radio beacons to be used, a module configured to obtain a distance measurement of the aircraft relative to each of the N radio beacons of said tuple, a module configured to compute an integrity position from distance measurements obtained by a predetermined computing method, and a module configured to use the computed integrity position as current integrity position.

15 Claims, 5 Drawing Sheets

(51) Int. Cl.
   *G01C 23/00* (2006.01)
   *G01C 21/00* (2006.01)
   *G01S 1/02* (2010.01)

(58) Field of Classification Search
   USPC ............ 701/528; 455/456.1, 456.5; 370/328; 342/457
   See application file for complete search history.

(56) References Cited

U.S. PATENT DOCUMENTS

| | | | | |
|---|---|---|---|---|
| 7,564,404 | B2* | 7/2009 | Katz | G01S 19/48 |
| | | | | 342/357.31 |
| 8,214,136 | B2* | 7/2012 | Caillaud | G01C 23/00 |
| | | | | 244/175 |
| 8,559,974 | B2* | 10/2013 | Alizadeh-Shabdiz | H04W 4/02 |
| | | | | 455/456.1 |
| 9,857,476 | B2* | 1/2018 | Mathews | G01S 5/0289 |
| 10,955,563 | B2* | 3/2021 | Haley | G01S 19/46 |
| 2005/0136845 | A1* | 6/2005 | Masuoka | G01S 1/042 |
| | | | | 455/67.14 |
| 2008/0252511 | A1* | 10/2008 | Jacotot | G01S 13/785 |
| | | | | 342/47 |
| 2011/0148714 | A1* | 6/2011 | Schantz | G01S 5/14 |
| | | | | 342/458 |
| 2011/0306361 | A1* | 12/2011 | Alizadeh-Shabdiz | |
| | | | | H04W 24/00 |
| | | | | 455/456.1 |
| 2018/0141661 | A1* | 5/2018 | Natarajan | B64D 1/22 |
| 2019/0197908 | A1* | 6/2019 | Mozer | G01S 5/163 |

OTHER PUBLICATIONS

T. Walter, P. Enge, J. Blanch and B. Pervan, "Worldwide Vertical Guidance of Aircraft Based on Modernized GPS and New Integrity Augmentations," in Proceedings of the IEEE, vol. 96, No. 12, pp. 1918-1935, Dec. 2008, doi: 10.1109/JPROC.2008.2006099. (Year: 2008).*
X. Wang and W. Li, "Design of an Accurate Yet Low-Cost Distributed Module for Vehicular Relative Positioning: Hardware Prototype Design and Algorithms," in IEEE Transactions on Vehicular Technology, vol. 68, No. 5, pp. 4494-4501, May 2019, doi: 10.1109/TVT.2019.2901743. (Year: 2019).*
K. B, R. N, M. K N and G. P, "Design of IoT based Instrument Landing System," 2021 International Conference on Disruptive Technologies for Multi-Disciplinary Research and Applications (CENTCON), 2021, pp. 207-212, doi: 10.1109/CENTCON52345.2021.9688057. (Year: 2021).*
S.-L. Jheng, S.-S. Jan, Y.-H. Chen and S. Lo, "1090 MHz ADS-B-Based Wide Area Multilateration System for Alternative Positioning Navigation and Timing," in IEEE Sensors Journal, vol. 20, No. 16, pp. 9490-9501, 15 Aug. 15, 2020, doi: 10.1109/JSEN.2020.2988514. (Year: 2020).*
S. Parida and S. K. Das, "G2A Communication Systems: A Survey on Evolving Enabling Technologies, Technical Challenges and Research Directions," 2020 Inter Conference on Emerging Trends in Information Technology and Engineering (ic-ETITE), 2020, pp. 1-6, doi: 10.1109/ic-ETITE47903.2020.ICETITE422 (Year: 2020).*
French Search Report, from the French Patent Office in counterpart French Application No. 1871548, dated Sep. 30, 2019.
Ruhnow, W. B. et al., "VOR/DME Automated Station Selection Algorithm", Navigation: Journal of the Institute of Navigation, vol. 29, No. 4, pp. 289-299, XP-002397142, Winter 1982-83, (1983).

* cited by examiner

METHOD AND SYSTEM FOR AIRCRAFT NAVIGATION

CROSS-REFERENCE TO RELATED APPLICATIONS

This application claims priority to French Patent Application No. 18 71548, filed on Nov. 13, 2018. The disclosure of the priority application is incorporated in its entirety herein by reference.

FIELD OF THE INVENTION

The present invention relates to a method for aircraft navigation and an associated navigation system.

It falls within the field of secure aeronautic navigation.

BACKGROUND OF THE INVENTION

The International Civil Aviation Organization (ICAO), which participates in the development of standards to standardize international aeronautical transportation, has defined performance-based navigation (PBN).

PBN consists of determining, from sensors installed on the aircraft, a spatial position of the aircraft and using this position to guide the aircraft along an airway defined by waypoints. The waypoints usable in civil aviation are defined by the ICAO.

In order to ensure precision, this type of navigation requires computing the position of the aircraft with an associated estimate of position uncertainty (EPU). The EPU is computed by adopting the hypothesis of an absence of latent failure that may affect the measurements used for the position computation. A position precision performance level can then be imposed, for example a precision of 95%+/−10 Nm (nautical miles).

In required navigation performance, or RNP navigation, it is also recommended to implement an on board surveillance and alert function making it possible to guarantee a probabilistic protection radius around the computed position with a given probability of leaving the protection radius, for example equal to $10^{-5}$/hour. This probability accounts for the hypothesis of the existence of latent failures affecting the measurements used for the position computation. The protection radius around a computed position is called HIL (Horizontal Integrity Limit).

In summary, RNP navigation imposes two position precision performance level indicators, a first indicator associated with the EPU, and a second indicator associated with the HIL. The position computation making it possible to respect these two indicators will be called position computation with integrity, and the computed position of the aircraft will be called integrity position.

In a known manner, the RNP navigation is implemented by using a satellite positioning system or GNSS (Global Navigation Satellite System). An aircraft carries receivers for signals coming from several satellites enabling an on-board computation of a position of the aircraft in a given three-dimensional coordinate system, which is for example the ECEF (Earth-Centered, Earth-Fixed) coordinate system.

However, situations exist in which the signals from the satellites are weak or experience interference, whether intentional or not, that disrupts the performed position computation. Furthermore, a risk also exists that one of the on-board GNSS receivers may experience a malfunction or a failure.

In order to improve the navigation safety, it is necessary to provide an alternative solution for the integrity position computation of the aircraft, which may be implemented in the navigation according to an RNP procedure.

Before the development of GNSS systems, air navigation used radio beacons, placed on the ground and capable of emitting radio signals with a given emission range. In particular, radio beacons exist that are capable of supplying a distance measurement relative to the aircraft, also called DME (Distance Measuring Equipment).

In the remainder of the description, the term "radio beacon" will refer to radio beacons of the DME type.

An aircraft provided with radio sensors suitable for operating in the emission frequency band of the radio beacons can obtain a distance estimate relative to a radio beacon when it is within the emission range of the radio beacon. To obtain an aircraft position respecting the first position precision performance indicator, it is necessary to use several radio beacons.

However, the on board position computation using the measurements obtained by means of radio beacons is not compatible, at this time, with RNP navigation. Indeed, no method exists making it possible to obtain an integrity position respecting the second position precision performance indicator, able to be implemented by an on board navigation system that has limited computing resources.

The invention aims to resolve this problem.

SUMMARY OF THE INVENTION

To that end, according to a first aspect, the invention proposes a method for aircraft navigation along a predetermined airway, supplying a positioning integrity of the aircraft during flight relative to said airway respecting an expected position precision performance level, the aircraft including at least one on-board radio receiver suitable for communicating with at least one land-based radio beacon suitable for supplying a distance of the aircraft relative to said radio beacon. This method includes, during its implementation in the navigation phase of the aircraft, the following steps:

a) from a current position of the aircraft, obtaining, from stored data, a tuple of radio beacons to be used, b) obtaining a distance measurement of the aircraft relative to each of the N radio beacons of said tuple, c) computing an integrity position from distance measurements obtained using a predetermined computing method, d) using the computed integrity position as current integrity position to guide the aircraft.

Advantageously, the navigation method according to the invention makes it possible to perform, on board an aircraft, an integrity position computation making it possible to apply the RNP navigation, from land-based radio beacons suitable for supplying a distance measurement. As a result, the inventive method allows an alternative for computing an integrity position relative to the methods based on signals received from position satellites.

The navigation method according to the invention may have one or more of the features below, considered independently or in combination:

It includes a prior phase for determining tuples of radio beacons, implemented by a computing device not on board the aircraft, including steps consisting, for at least one segment associated with said airway, of determining at least one tuple of radio beacons usable to compute, by applying said computing method, an integrity position of the aircraft when it flies over a spatial area associated with said segment according to said expected position precision performance level, and storing data relative to tuples of determined radio beacons in a database.

Each segment of the airway is defined by two endpoints called sequencing points, the determination comprising a determination of said sequencing points from passage points defining said airway, the waypoints being spaced apart by a predetermined progress pitch, two successive segments along said airway having different associated tuples of radio beacons.

The overflown spatial areas are shown on a meshed map, the method including the following steps:
  determining a series of meshes of said map overflown by said airway,
  for each of said meshes, determining at least one tuple of radio beacons making it possible to compute an integrity position of an aircraft flying over said mesh of said map.

The determination of a tuple of radio beacons includes a test of a plurality of tuples of radio beacons, each tuple including N radio beacons selected from among a number L greater than N radio beacons within reception range of an aircraft flying over said spatial area, the test comprising, for each tuple of tested radio beacons, obtaining N distance measurements, each distance measurement being supplied by one of said radio beacons, and an integrity position computation and an associated integrity radius, and a comparison of the integrity radius with a determined threshold value as a function of the expected position precision performance level.

The method includes, in the navigation phase of the aircraft, during step a) for obtaining a tuple of radio beacons, a selection of a tuple of radio beacons and an availability verification of each of the radio beacons of said selected tuple of radio beacons, and in case of unavailability, selection of another tuple of radio beacons from the stored database.

The method includes, in the navigation phase of the aircraft, determining, from the current position of the aircraft, a corresponding map mesh, and obtaining a tuple of radio beacons associated with the determined corresponding mesh.

The method includes, in the navigation phase of the aircraft, a determination, from a current position of the aircraft associated with a current sequencing point, a selection of a tuple of radio beacons stored in association with a segment defined by the current sequencing point and a following sequencing point along the airway of the aircraft.

The method includes verifying that the aircraft has reached the following sequencing point, and obtaining a new tuple of radio beacons to be used following the passing of said following sequencing point.

The method further includes, after step b) for obtaining distance measurements, a consistency verification of the obtained distance measurements, and, in case of inconsistency, a determination of a radio beacon supplying an inconsistent distance measurement and, in case of successful determination, a storage, in a database of unusable radio beacons, of an identifier of the or each radio beacon supplying an inconsistent measurement.

It further includes raising an alarm if an inconsistency is noted.

The method includes, prior to obtaining a distance measurement, tuning at least one on-board radio receiver to an emission frequency of a radio beacon of said tuple.

According to another aspect, the invention relates to a system for aircraft navigation along a predetermined airway, including an on-board navigation system and including an electronic computing device including at least a processor and a memory unit, supplying a positioning integrity of the aircraft during flight relative to said airway respecting an expected position precision performance level, and at least one on-board radio receiver on the aircraft suitable for communicating with at least one land-based radio beacon suitable for supplying a distance of the aircraft relative to said radio beacon. The system includes modules, implemented in the navigation phase of the aircraft, including:
  a module configured to obtain, from a current position of the aircraft, from data stored in said memory unit, a tuple of radio beacons to be used,
  a module configured to obtain, by at least one of said on-board receivers, a distance measurement of the aircraft relative to each of the N radio beacons of said tuple,
  a module configured to compute an integrity position from distance measurements obtained using a predetermined computing method, and
  a module configured to use the computed integrity position as current integrity position.

The system further includes an off-board system, including an electronic computing device suitable for implementing a module for determining tuples of radio beacons, configured, for at least one segment associated with said airway, for determining at least one tuple of radio beacons usable to compute, by applying said computing method, an integrity position of the aircraft when it flies over a spatial area associated with said segment according to said expected position precision performance level and to store determined radio beacon tuple relative data in a database.

According to another aspect, the invention relates to a computer program including software instructions which, when executed by an electronic computing device, carry out a navigation method as briefly described above.

According to another aspect, the invention relates to an information medium, on which software instructions are recorded which, when executed by an electronic computing device, carry out a navigation method as briefly described above.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF EMBODIMENTS

Figure 1:
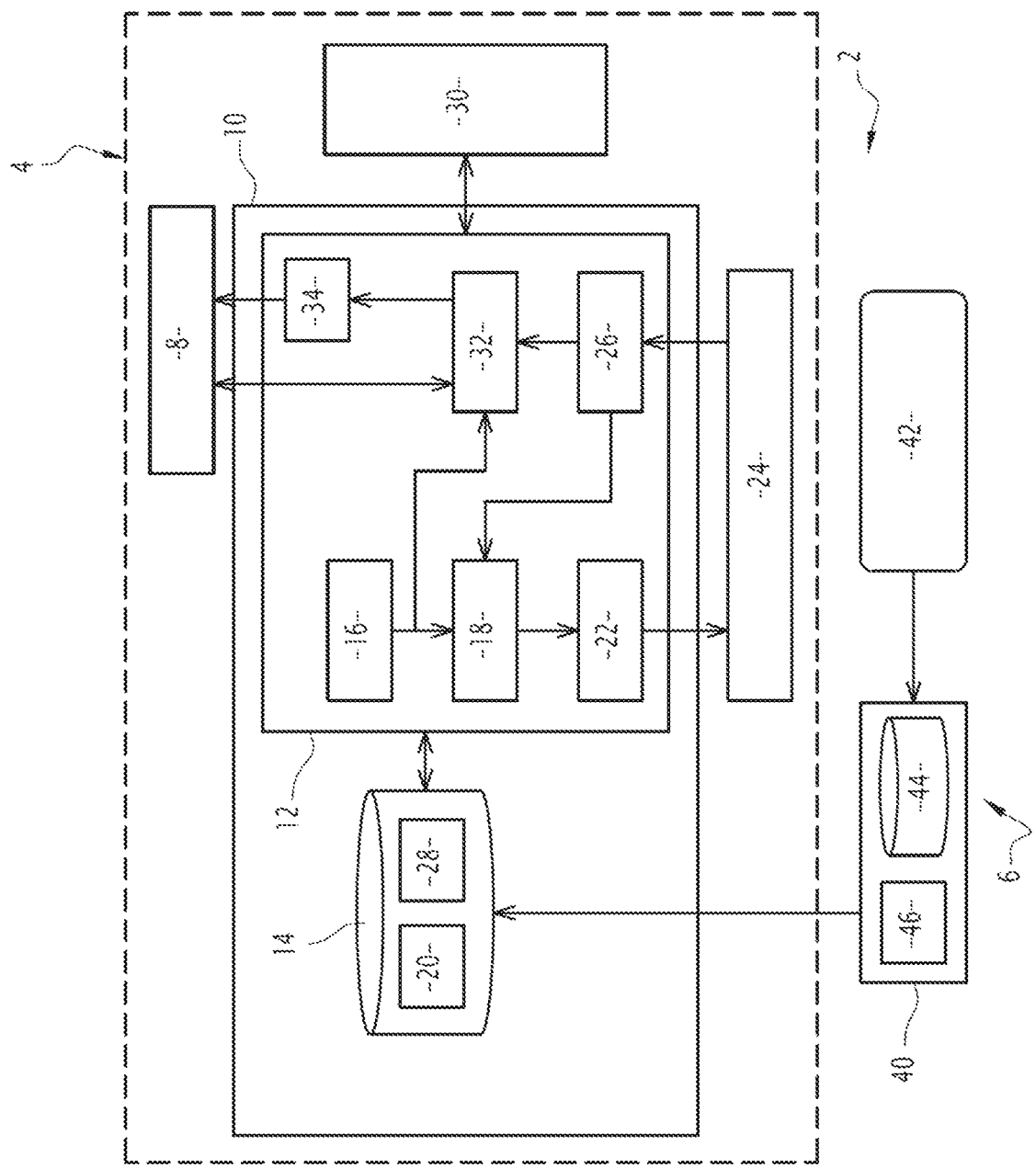
FIG. 1 is a schematic illustration of an aircraft navigation system according to one embodiment.

FIG. 1 schematically illustrates a navigation system 2 according to one embodiment of the invention.

Figure 2:
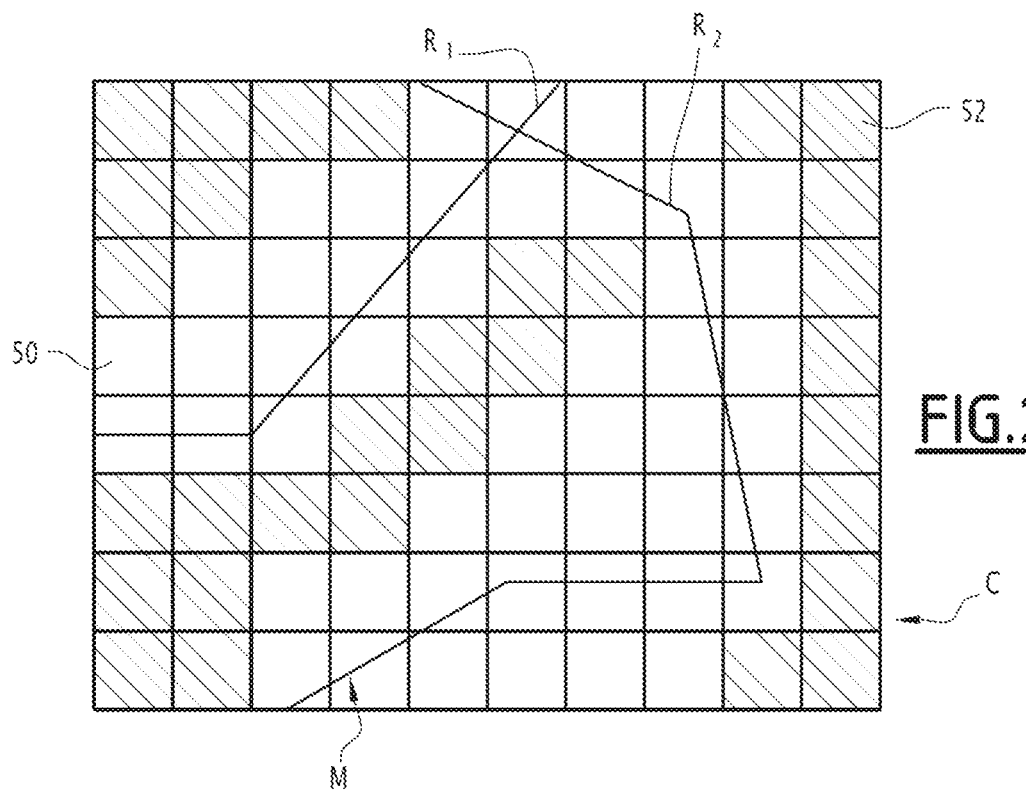
FIG. 2 schematically shows a meshed map and projections of airways on this map.

FIG. 2 includes an on-board navigation system 4, on board the aircraft (not shown), and an off-board system 6, suitable for implementing a prior phase for navigation data preparation, that is to say, determining tuples of radio beacons, as explained in detail hereinafter.

The on-board navigation system 4 has been shown schematically, only the elements involved in the implementation of the invention being shown. It is understood that an on-board navigation system includes, in a known manner, other elements (sensors, rotator controls, etc.) that are not shown here.

The on-board navigation system 4 includes a man-machine interface (MMI) 8, allowing the pilot(s) to interact in particular with a FMS (flight management system) 10 implemented by an on-board electronic computing device.

The man-machine interface 8 includes, in a known manner, one or several screens, optionally touch-sensitive, one or several control entry elements, and one or several microphones.

The flight management system 10 is implemented by an electronic computing device, including a computing unit 12 including one or several electronic processors suitable for performing computations when they are powered on. For example, processors of the CPU or GPU type are used.

The electronic computing device further includes a memory 14 associated with the processors of the computing unit 12.

The computing unit 12 is suitable for executing modules 16, 18, 22, 26, 32 and 34, made in the form of software components, that is to say, computer programs, described hereinafter.

The computing unit 12 implements a module 16 for computing an unprotected position that corresponds to the computation of a position by algorithm for triangulating measurements supplied by the DME radio beacons, without the geometry or the number of beacons making it possible to compute an associated integrity. For example, distance measurements supplied by 3 DME radio beacons are used.

The unprotected position is a position of the aircraft in a chosen coordinate system with three dimensions, for example the ECEF (Earth-Centered, Earth-Fixed) coordinate system or another geo-referenced coordinate system.

This unprotected position is transmitted to a module 18 for selecting a tuple of radio beacons $\{DME_1 \ldots DME_N\}$ to be used in order to calculate a current integrity position of the aircraft. A tuple of DME radio beacons $\{DME_1 \ldots DME_N\}$ makes it possible to obtain a tuple of distance measurements of the aircraft relative to each of the considered radio beacons.

In a known manner, the term "tuple" refers to a set of N elements.

This tuple is made up of a subset of radio beacons suitable for supplying a distance measurement in whose emission range the current position of the aircraft is located.

The selection module 18 is suitable for reading data relative to tuples of radio beacons recorded in a database 20, stored in the memory unit 14. Embodiments of the computation of data of the database 20, done in a prior phase, will be described in detail hereinafter.

Advantageously, the tuples of stored radio beacons are selected to allow the computation of an integrity position having an associated protection radius compatible with RNP navigation with a given position precision performance level. In particular, the selected geometry or number of radio beacons make it possible to compute an associated integrity.

In particular, the stored data comprise an identifier $Id_i$ and an emission frequency $Fe_i$ of each radio beacon $DME_i$ belonging to a tuple of radio beacons.

The emission frequencies $Fe_i$ are transmitted to a tuning module 22 of the radio receivers 24 on board the aircraft.

The radio receiver(s) 24 comprise several reception channels able to be tuned to the frequencies $Fe_i$, and after the reception of a radio signal emitted by a DME radio beacon, are suitable for receiving a distance measurement relative to the radio beacon. The distance $D_j$ supplied by a radio beacon $DME_j$ is an estimated distance between the spatial position of the radio beacon in the geo-referenced coordinate system and a point of the aircraft, at the moment of reception of the radio signal emitted by the radio beacon, in the same coordinate system.

The measured distances $D_j$ are transmitted to a module 26 for computing an integrity position of the aircraft. For example, the module 26 implements an algorithm equivalent to the RAIM (Receiver autonomous integrity monitoring) used for GPS. In this type of algorithm, several successive position computations are done by successively excluding measurements. The algorithm thus manages to determine a circle of uncertainty corresponding to the envelope of the positions computed with a faulty measurement. The radius of such a circle is the radius of protection associated with the calculated integrity position.

Furthermore, the algorithm implemented by the module 26 also makes it possible to reject distance measurements that are considered unusable, which indicate the existence of a failure or interference. The radio beacons corresponding to the rejected distance measurements are identified and stored, for example in a database 28 of unusable radio beacons.

If one or several distance measurements are rejected, it is possible that the computed position does not comply with the stipulated performance indicators. In this case, it is provided to use another tuple of radio beacons previously stored, not including an unusable radio beacon.

If none of the distance measurements are rejected, the computed integrity position is transmitted to the guidance system 30 for secure guidance of the aircraft, and optionally displayed in a selected form on the man-machine interface 8. The computed integrity position has an associated EPU precision.

Furthermore, the system includes a module 32 for computing a radius of protection around the unprotected position computed by the module 16, by using the integrity position of the aircraft computed by the module 26, making it possible to determine whether the position precision and the protection radius are compatible with a desired RNP position precision performance level.

If the desired performance level is not achieved, an alert emission module 34 makes it possible to alert the pilot(s), by transmitting an alert to the MMI 8.

The emitted alert is for example information displayed on a viewing screen or a sound alert.

The navigation system 2 also includes an electronic computing device 40, for example installed in a ground processing station. This electronic computing device 40 includes processors of the CPU or GPU type and memory units, suitable for performing large computing volumes on large data volumes. The computing device 40 receives information for defining airways, for example from an external server 42. These airways are for example defined by navigation authorities like the ICAO, and can be updated at regular time intervals. The airways are stored in a memory unit 44 of the electronic computing device 40.

The computing device 40 stores characteristic data of the radio beacons placed on the ground, in particular including, for each radio beacon, its position in the predetermined 3D coordinate system, an associated identifier, an emission frequency and the emission range of the radio beacon.

The computing device 40 implements a module 46 for determining, for at least one given airway, defined by a set of waypoints, at least one tuple of radio beacons to be used to compute an integrity position along a segment of this airway, corresponding to a flyover of a corresponding spatial area.

Preferably, a plurality of tuples is computed for each airway segment, to address any failures or incidents that may occur periodically on a radio beacon.

The number N is for example equal to 4 or 5.

Each tuple of radio beacons makes it possible to obtain an integrity position computation according to a given RNP position precision performance level, when a given algorithm for computing a position from N distance measurements is implemented.

The selection of N radio beacons implements a high combinatorial.

Advantageously, the implementation of the determining module 46 by an electronic computing device of a ground station, before the effective navigation phase, makes it possible to perform lengthy calculations and to test several possible tuples for a given passage point, each possible tuple being made up of radio beacons within whose emission range this passage point is located. For example, finding an optimal quintuplet of beacons when 20 beacons are visible represents 15,504 possible arrangements.

Advantageously, the tuples are computed and selected beforehand, and a list of relevant tuples is loaded into the database of the on-board navigation system.

The method for aircraft navigation according to the invention includes two phases:
- a prior phase, implemented by an electronic computing device of a ground station, for determining tuples of radio beacons making it possible to compute an integral aircraft position, and storing data relative to these tuples, for one or several airways;
- a navigation phase, implemented by an on-board navigation system, for computing an integral in-flight position along a given airway.

Figure 3:
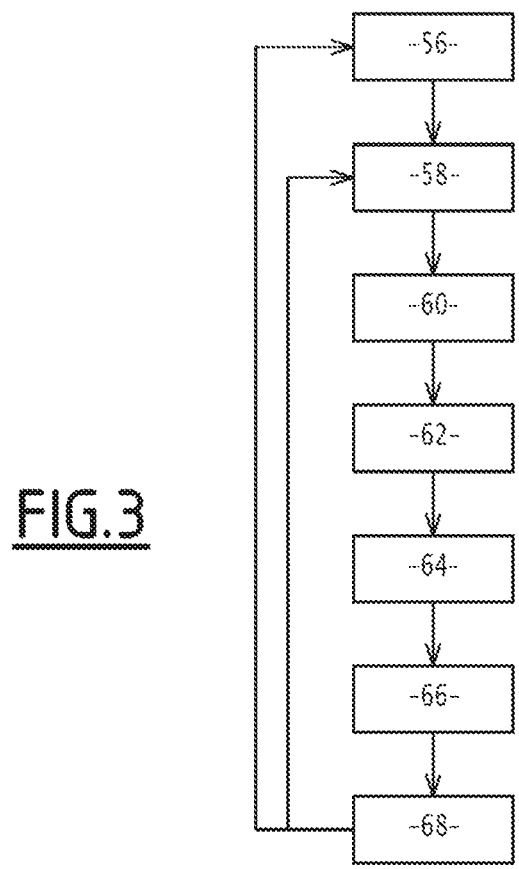
FIG. 3 is a flowchart of the main steps of a first embodiment of a prior phase for determining tuples of radio beacons.

FIG. 3 is a flowchart of the main steps of a first embodiment of the determination and storage of tuples of radio beacons.

In this first embodiment, a two-dimensional map is used of the areas flown over by one or several airways.

FIG. 2 schematically illustrates such a map C, made up of meshes M of predefined shape and size. Typically, the meshes are defined in arc of latitude and longitude. For example, square meshes with sides measuring in the order of 5 minutes of arc are used.

The map includes meshes 50 that are flown over by one or several airways, and meshes 52, which are crosshatched in FIG. 2 and correspond to geographical areas not flown over by airways.

Examples of airways R1, R2 are illustrated schematically.

The first embodiment of the method for an airway R, described in reference to FIG. 3, includes the following steps.

Any point belonging to the route R is called passage point of the route R. In particular, the waypoints are passage points.

During a first step 56, the meshes intersected by segments of the route R are determined.

For each mesh (step 58), the visible radio beacons L are determined in step 60, that is to say, such that an aircraft flying over the considered mesh at a flight altitude below a predetermined value receives the radio signals emitted by these radio beacons.

The number L is for example between 0 and 100. Of course, the number L of visible beacons can vary from one mesh to another.

Step 60 for determining L visible radio beacons is followed by step 62 for determining one or several tuples of radio beacons making it possible to achieve a given RNP position precision performance level.

Preferably, the number N is significantly lower than L, for example, N is between 3 and 5.

In one embodiment, the number N is chosen to be consistent with the number of reception channels of the radio receiver devices on board an aircraft.

In one embodiment, all of the subsets of N radio beacons among the L visible radio beacons are tested relative to a simulated flight along the airway R: for each tuple of radio beacons $RB_K = \{DME_{K,1}, \ldots, DME_{K,N}\}$, the distance measurements $\{D_{K,1}, \ldots, D_{K,J}\}$ are estimated at a point of the simulated route, with known reference spatial position, and an algorithm for calculating the estimated position of the aircraft from the distances $\{D_{K,1}, \ldots, D_{K,J}\}$ is implemented. The position precision performance level indicators are also estimated for the considered tuple of radio beacons $RB_K$.

Only the tuples of radio beacons $\{RB_K\}$ making it possible to obtain a required performance level are retained at the end of step 62.

For each tuple of radio beacons selected in step 62, one optionally implements a step 64 for testing tuples formed by N−1 radio beacons, making it possible to obtain a tuple of measurements by adding an altitude measurement of the aircraft to the N−1 distance measurements relative to the N−1 selected DME radio beacons.

Lastly, only the tuples of radio beacons whose associated protection radius is below a predetermined value, for example between 0.6 Nm to 2 Nm, are selected in step 66 and stored in a list associated with the current mash.

Next, for each selected tuple, in the step 68 for storing data representative of the radio beacon, the following are stored: the identifiers of the radio beacons forming the tuple, their emission frequencies.

For example, 1 to 2*N tuples of radio beacons are stored per mesh of the map.

In one embodiment, the tuples of radio beacons are stored in the increasing order of the protection radii for each mesh.

Steps 58 to 68 are repeated for each mesh selected in step 56.

Advantageously, the lists of tuples of radio beacons are stored in association with meshes of a map, therefore if several airways fly over the same terrain areas, the selected tuples of radio beacons can be used, and it is not necessary to redo the computations.

Figure 4:
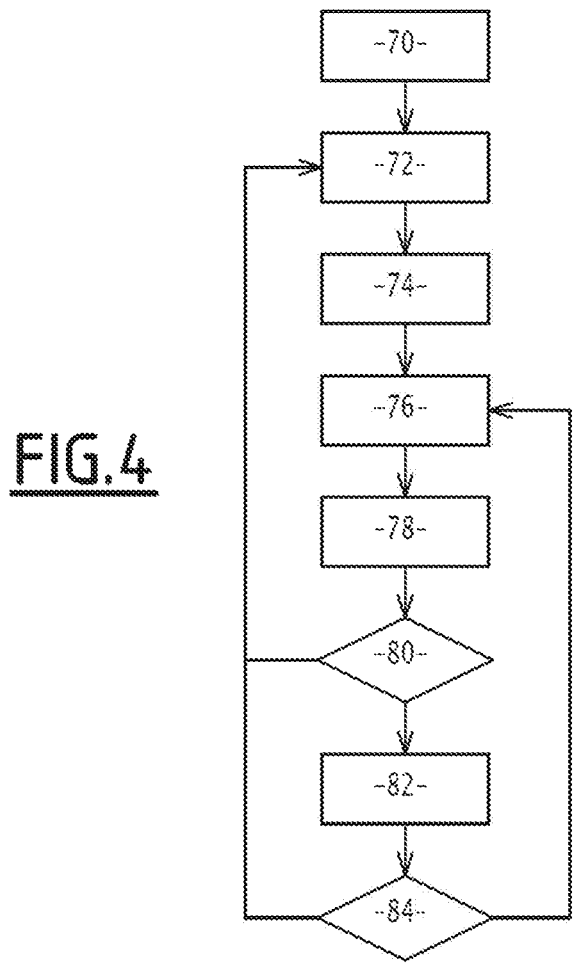
FIG. 4 is a flowchart of the main steps of a second embodiment of a prior phase for determining tuples of radio beacons.

FIG. 4 is a flowchart of the main steps of a second embodiment of the determination and storage of tuples of radio beacons for an airway defined by given waypoints.

Unlike the first embodiment, a mesh of the terrain overflown by the airway is not used.

In this second embodiment, sequencing points of tuples of radio beacons are determined along a chosen airway R. A tuple of radio beacons is associated with an airway segment comprised between two sequencing points.

The method according to this second embodiment comprises a first initialization step 70, including obtaining a list of coordinates of waypoints of the airway R defined in a 2D or 3D coordinate system and spaced apart by a progress pitch P along the airway. The progress pitch P is a distance, preferably between 0.5 Nm and 2 Nm.

The current passage point is initialized on the path with the initial point of the path. The following step (step 72) is the search for a tuple at the current passage point that allows the computation of a protection radius below a threshold RNPMin, for example equal to 0.6 Nm, or which supplies the minimum value of the protection radius of between 0.6 Nm and 2 Nm if one does not manage to find a tuple that yields a value below 0.6 Nm.

It is followed by a step 74 for storage of the tuple that yields the desired performance, for a path segment having a first end equal to the current passage point. This tuple becomes the current tuple. The current passage point is a sequencing point of the tuples of the airway.

An advance by a pitch P on the path is made. The point on the path becomes the current passage point (step 76).

In the following step 78, a search for DME radio beacons visible at the current passage point is done.

Step 80 consists of determining whether the DME radio beacons of the current tuple are visible from the current passage point.

If one of the DME radio beacons of the current tuple is no longer visible, the current passage point is the second end of the segment associated with the current tuple. One next returns to step 72 for determining a new tuple of radio beacons supplying the desired performance. Otherwise, one continues with step 82, which consists of computing the radius of protection of the position computed from measurements supplied by the DME radio beacons of the current tuple.

The following step 84 consists of comparing the radius of protection thus computed with a predetermined maximum threshold value RNPmax, for example equal to 1.6 Nm, and preferably between 1.6 Nm and 2 Nm.

If the value of the radius of protection is less than RNPMax, one starts again at step 76, unless the current passage point is the last point of the path, in which case the process ends.

Otherwise, step 84 is followed by step 72 previously described.

A tuple making it possible to obtain a protection radius smaller than RNPMax is called nominal tuple.

Once the process is finished in the nominal case, that is to say, one has determined all of the tuples along the path making it possible to compute a position protected by a radius of protection less than RNPMax from distance measurements relative to the radio beacons defined by these tuples, the process is started over in order to determine the selection to be considered in the downgraded cases where one of the DME radio beacons provided in a tuple is not available.

In other words, the list is established of considered DME radio beacons in all of the tuples $\{DME_k\}$, and for each of the radio beacons $DME_k$ of this list, the search process is restarted by eliminating the considered radio beacon $DME_K$ from the list. One then obtains, at each point where the radio beacon $DME_k$ is considered in the normal case, an alternative list of tuples to be considered in case of absence or detection of failure on the radio beacon $DME_k$.

Advantageously, in this second embodiment, the number of sequencing points with which tuples of radio beacons are associated making it possible respect the given position precision performance level is minimized.

Figure 5:
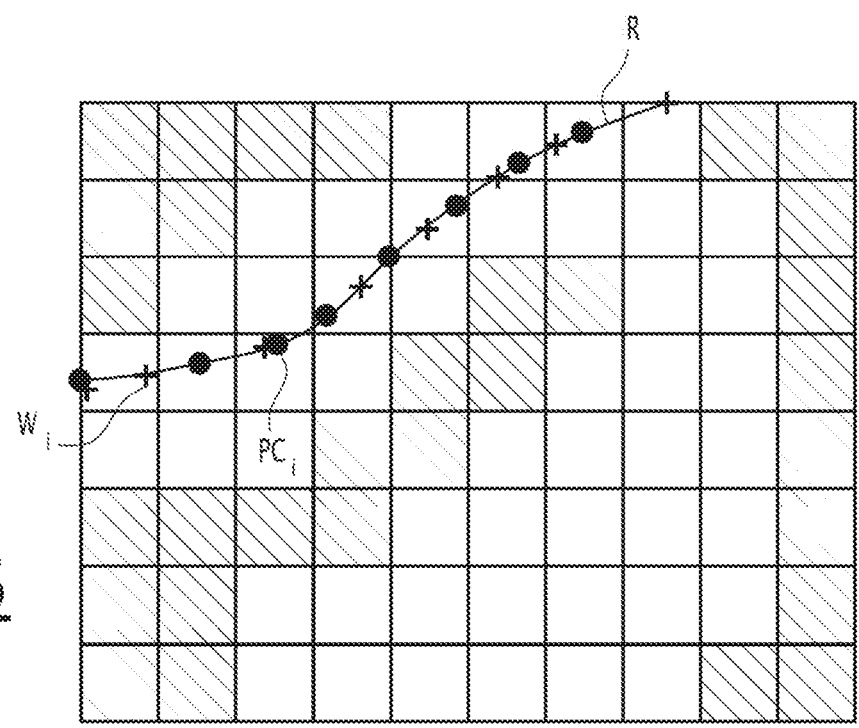
FIG. 5 schematically shows an airway projection with sequencing points of tuples of radio beacons.

FIG. 5 schematically illustrates an airway R, passage points $W_i$ defining this airway and sequencing points $PC_i$ of tuples of radio beacons selected by improving the method according to the second embodiment described above.

The data associated with the tuples of selected radio beacons, for at least one given airway, according to the first or according to the second embodiment described above, are stored in a database 20 intended to be taken on board or made accessible for use thereof in an effective flight phase by an on-board aircraft navigation system.

Figure 6:
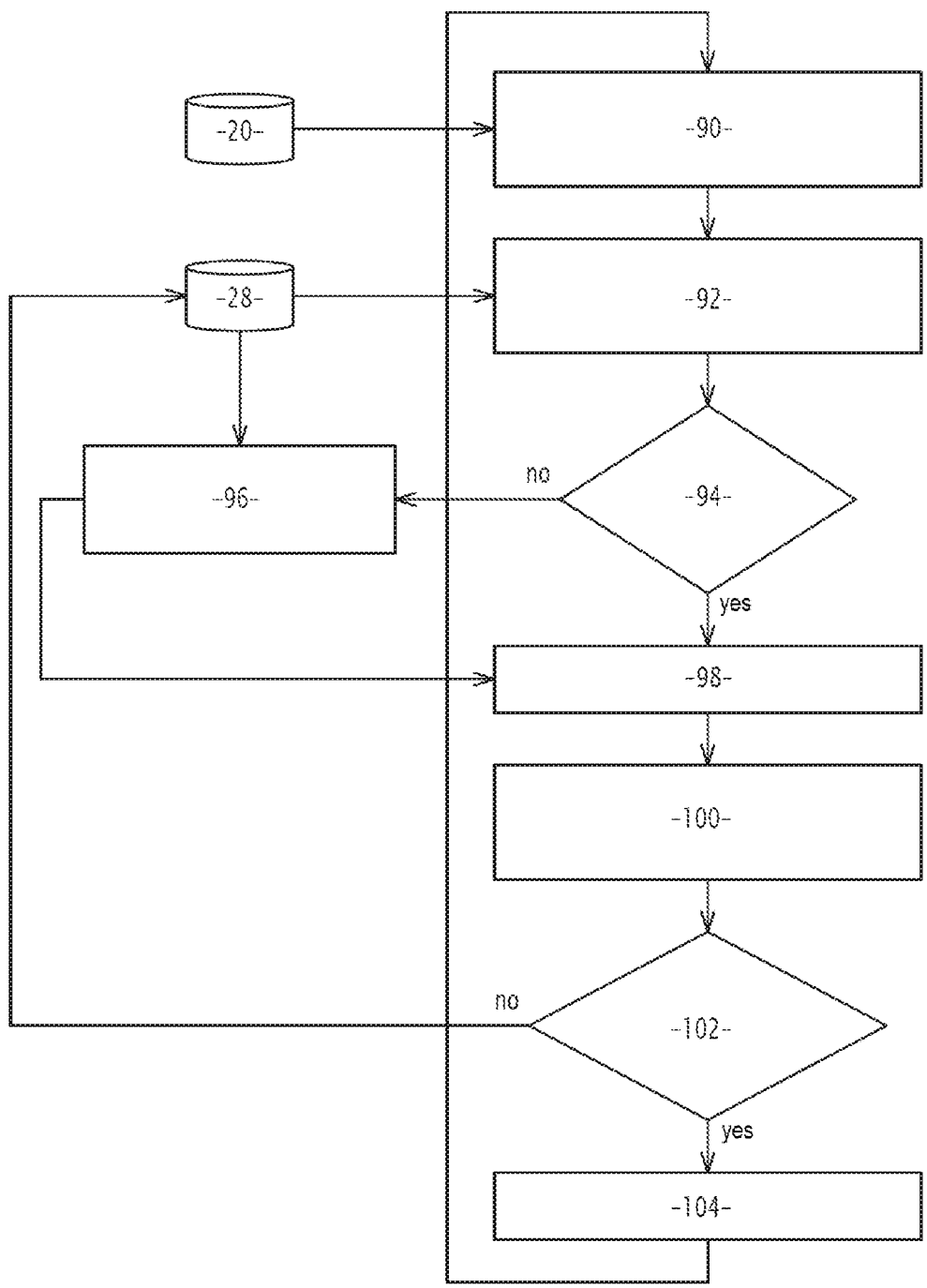
FIG. 6 is a flowchart of the main steps of a first embodiment of an in-flight navigation phase, implementing tuples of radio beacons determined according to the first embodiment of the prior phase.

FIG. 6 is a flowchart of the main steps of a first embodiment of a method for navigation in a flight phase, using a database 20 in which data are stored relative to tuples of radio beacons associated with meshes of a map.

In this first embodiment, a two-dimensional map is used of the areas flown over by one or several airways, as illustrated schematically in FIG. 2.

The steps are preferably implemented by execution of a computer program by one or several processors of an on-board navigation system 10.

During a first step 90, the mesh associated with the current position of the aircraft, called current mesh, is determined relative to a preceding position of the aircraft. Initially, the current position of the aircraft is the position of the starting point of the airway to be followed.

For example, the determination of the mesh associated with the current position is made relative to the latitude and longitude coordinates defining the meshes of the map stored in the database 20.

Next, a step 92 for selecting a tuple of usable radio beacons is carried out. During this step, the tuples of radio beacons associated with the current mesh stored in the database are considered in increasing order of radii of protection, and for each tuple, it is verified that no radio beacon of the tuple has been marked as being unusable. If all of the radio beacons of the considered tuple are usable, this tuple is retained in step 92.

If no tuple of valid radio beacons has been found in the verification step 94, this step is followed by a step 96 for implementing a conventional algorithm for selecting radio beacons, for example by searching for 3 DME beacons having a geometric configuration making it possible to maximize the minimum value of the angles of the triangle formed by these beacons. The tuple of radio beacons thus selected will be used during step 98 described hereinafter.

If a tuple $RB=\{DME_1, \ldots, DME_N\}$ of valid radio beacons has been selected, step 94 is followed by step 98 for adjusting frequency channels of on-board radio receiver devices as a function of the emission frequencies of the radio beacons of the selected tuple.

A reception of distance measurements $\{D_1 \ldots D_N\}$ and a consistency verification is applied in step 100.

Conventionally, each radio beacon $DME_i$ emits its identifier and information making it possible to compute the distance between this beacon and a point of the aircraft or a distance measurement between the beacon and the aircraft.

The implemented consistency verification comprises comparing the received identifier to the identifier of the radio beacon $DME_i$ extracted from the database 20, and comparing (step 102) the obtained distance measurement relative to an estimated distance by using the preceding spatial position.

If an inconsistency is noted (response no in step 102), for example when the deviation between obtained distance measurement and the estimated distance is above a predetermined distance threshold, the radio beacon $DME_i$ is identified as being unusable in the database 28 of radio beacons not to use. Furthermore, the method returns to step 92 for selecting a tuple of usable radio beacons.

In case of consistency verification, step 102 is followed by a step 104 for computing an integrity position, as well as associated position precision performance level indicators. These are precision (EPU) and integrity (HIL) indicators. The integrity position is supplied as new current position, and is also transmitted to the guidance system 30 for secure guidance of the aircraft.

The algorithm for computing the integrity position from distance measurements $D_i$ received from radio beacons $DME_i$ is the same as that used during the prior phase for determining tuples of radio beacons.

In a variant that is not shown, in the particular case where it is not possible to determine which radio beacon $DME_i$ supplies an inconsistent distance measurement, an alarm is raised.

According to one variant, in addition to distance values obtained from a tuple of radio beacons DME, an altitude estimate is used.

Figure 7:
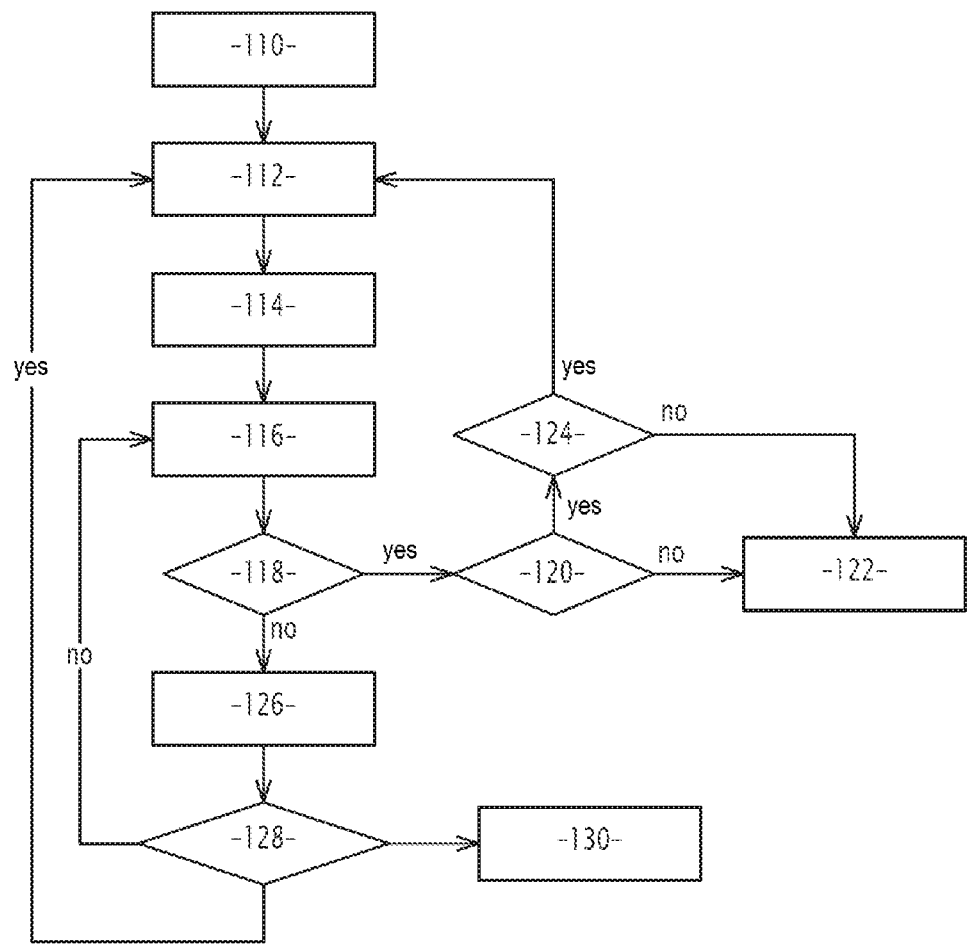
FIG. 7 is a flowchart of the main steps of a second embodiment of an in-flight navigation phase, implementing tuples of radio beacons determined according to the second embodiment of the prior phase.

FIG. 7 is a flowchart of the main steps of a second embodiment of a method for navigation in a flight phase, using a database 20 in which data are stored relative to a list of sequencing points of tuples of radio beacons to be used for the integrity position calculation along a selected airway.

The steps are preferably implemented by execution of a computer program by one or several processors of an on-board navigation system 10.

The method begins with an initialization step 110, for selecting the first sequencing point of the protected airway having at least one associated tuple of radio beacons previously stored.

Next, in step 112, a tuple of radio beacons is selected associated with the current sequencing point, for the segment of the airway extending between the current sequencing point and the following sequencing point along the airway in progress. This selection is the nominal tuple at the current point if none of the DME radio beacons of this list are indicated as being unusable, or the alternative selection in case of the presence of one or several unusable radio beacons in the nominal tuple.

A step 114 for tuning on the radio communication frequency channels of the radio beacons of the selected tuple of radio beacons is implemented. Distance measurements are obtained.

Next, step 116 is carried out for computing the integrity position (current position of the aircraft), done from distance measurements obtained in the preceding step.

The computing algorithm implements a consistency verification similar to that described in reference to step 100.

When an inconsistency is detected during a duration greater than or equal to a given duration, for example during more than 30 consecutive seconds (step 118), an alarm is raised (step 122) if it is not possible to determine the radio beacon that is at the origin of the inconsistency (step 120).

If the radio beacon at the origin of the inconsistency is identified ("yes" response in step 120), it is verified in step 124 whether an alternative tuple exists associated with the current point and that does not contain the identified radio beacon. If such a tuple exists, the step 124 is followed by the step 112 previously described. Otherwise, the step 124 is followed by the step 122 for raising alarm.

If no inconsistency is detected, the integrity position computed in step 116 is supplied as new current position, and is also transmitted to the guidance system 30 for secure guidance of the aircraft.

If no inconsistency is detected in step 118 during a duration greater than or equal to a given duration, it is followed by a step 126 for determining the distance from the current point to the next sequencing point.

As long as the following sequencing point is not reached ("no" response in step 128), steps 116 to 126 are repeated.

When the next sequencing point is reached ("yes" response in step 128), the method returns to step 112, the next sequencing point becomes the current sequencing point and a new tuple of radio beacons associated with the current sequencing point is selected. Steps 114 to 128 are repeated. If the next sequencing point reached is the last passage point of the airway, the method ends (step 130).

The invention claimed is:

1. A method for aircraft navigation along a predetermined airway, supplying a positioning integrity of the aircraft during flight relative to said airway respecting an expected position precision performance level, the aircraft including at least one on-board radio receiver suitable for communicating with at least one land-based radio beacon suitable for supplying a distance of the aircraft relative to said radio beacon,
   comprising, during its implementation in a navigation phase of the aircraft:
   a) from a current position of the aircraft, obtaining, from stored data, a tuple of N radio beacons to be used,
   b) obtaining a distance measurement of the aircraft relative to each of the N radio beacons of said tuple,
   c) computing an integrity position, with a probabilistic protection radius around the computed integrity position, from distance measurements obtained using a predetermined computing method,
   d) using the computed integrity position as current integrity position to guide the aircraft.

2. The method according to claim 1, comprising a prior phase for determining tuples of radio beacons, implemented by a computing device not on board the aircraft, comprising steps consisting, for at least one segment associated with said airway, of determining at least one tuple of radio beacons usable to compute, by applying said computing method, an integrity position of the aircraft when it flies over a spatial area associated with said segment according to said expected position precision performance level, and storing data relative to tuples of determined radio beacons in a database.

3. The method according to claim 2, wherein each segment of the airway is defined by two endpoints called sequencing points, the determination comprising determining the sequencing points from passage points defining said airway, waypoints being spaced apart by a predetermined progress pitch, two successive segments along said airway having different associated tuples of radio beacons.

4. The method according to claim 2, wherein the overflown spatial areas are shown on a meshed map, the method comprising:
   determining a series of meshes of said map overflown by said airway,
   for each of said meshes, determining at least one tuple of radio beacons making it possible to compute an integrity position of an aircraft flying over said mesh of said map.

5. The method according to claim 2, wherein the determination of a tuple of radio beacons comprises testing a plurality of tuples of radio beacons, each tuple including N radio beacons selected from among a number L greater than N radio beacons within reception range of an aircraft flying over said spatial area, the test comprising, for each tuple of tested radio beacons obtaining N distance measurements, each distance measurement being supplied by one of said radio beacons,
  computing an integrity position and an associated integrity radius, and
  comparing the integrity radius with a determined threshold value as a function of the expected position precision performance level.

6. The method according to claim 1, comprising, in the navigation phase of the aircraft, during step a) of obtaining a tuple of radio beacons, a selection of a tuple of radio beacons and an availability verification of each of the radio beacons of said selected tuple of radio beacons, and in case of unavailability, selection of another tuple of radio beacons from the stored database.

7. The method according to claim 6, comprising, in the navigation phase of the aircraft, determining, from the current position of the aircraft, a corresponding map mesh, and obtaining a tuple of radio beacons associated with the determined corresponding mesh.

8. The method according to claim 3, comprising, in the navigation phase of the aircraft, determining, from a current position of the aircraft associated with a current sequencing point, a selection of a tuple of radio beacons stored in association with a segment defined by the current sequencing point and a following sequencing point along the airway of the aircraft.

9. The method according to claim 8, comprising verifying that the aircraft has reached the following sequencing point, and obtaining a new tuple of radio beacons to be used following a passing of said following sequencing point.

10. The method according to claim 1, further comprising, after step b) of obtaining distance measurements, a consistency verification of the obtained distance measurements, and, in case of inconsistency, determining a radio beacon supplying an inconsistent distance measurement and, in case of successful determination, storing, in a database of unusable radio beacons, an identifier of the or each radio beacon supplying an inconsistent measurement.

11. The method according to claim 10, further comprising raising an alarm if an inconsistency is noted.

12. The method according to claim 1, comprising, prior to obtaining a distance measurement, tuning at least one on-board radio receiver to an emission frequency of a radio beacon of said tuple.

13. A non-transitory computer-readable recording medium having stored therein a program that, when a processor coupled to a memory and the processor is configured to execute the program, causes the processor to be configured to carry out the method according to claim 1.

14. A system for aircraft navigation along a predetermined airway, including an on-board navigation system and including an electronic computing device including at least a processor and a memory unit, supplying a positioning integrity of the aircraft during flight relative to said airway respecting an expected position precision performance level, and at least one on-board radio receiver on the aircraft suitable for communicating with at least one land-based radio beacon suitable for supplying a distance of the aircraft relative to said radio beacon, the electronic computing device comprising the at least one processor in a navigation phase of the aircraft and configured to:
  obtain, from a current position of the aircraft, from data stored in said memory unit, a tuple of N radio beacons to be used,
  obtain, by at least one of said on-board receivers, a distance measurement of the aircraft relative to each of the N radio beacons of said tuple,
  a compute an integrity position, with a probabilistic protection radius around the computed integrity position, from distance measurements obtained using a predetermined computing method, and
  implement the computed integrity position as current integrity position.

15. The system for aircraft navigation according to claim 14, further comprising an off-board system, including a second electronic computing device and configured to:
  determine tuples of radio beacons for at least one segment associated with said airway
  determine at least one tuple of radio beacons usable to compute, by applying said computing method, an integrity position of the aircraft when it flies over a spatial area associated with said segment according to said expected position precision performance level; and
  to store determined radio beacon tuple relative data in a database.

* * * * *